US012679631B2

(12) United States Patent
Chen

(10) Patent No.: US 12,679,631 B2
(45) Date of Patent: Jul. 14, 2026

(54) POWDER BRIDGING BREAKER

(71) Applicant: Kao-Sung Chen, Tainan City (TW)

(72) Inventor: Kao-Sung Chen, Tainan City (TW)

( * ) Notice: Subject to any disclaimer, the term of this patent is extended or adjusted under 35 U.S.C. 154(b) by 170 days.

(21) Appl. No.: 18/639,277

(22) Filed: Apr. 18, 2024

(65) Prior Publication Data

US 2025/0263226 A1 Aug. 21, 2025

(30) Foreign Application Priority Data

Feb. 19, 2024 (TW) ................................. 113105869

(51) Int. Cl.
| | |
|---|---|
| B65D 88/66 | (2006.01) |
| B65D 88/68 | (2006.01) |
| B65D 88/70 | (2006.01) |
| B65D 90/00 | (2006.01) |
| B65G 65/48 | (2006.01) |
| H05F 3/02 | (2006.01) |

(52) U.S. Cl.
CPC ............. B65D 88/66 (2013.01); B65D 88/68 (2013.01); B65D 88/70 (2013.01); B65D 90/00 (2013.01); B65G 65/4872 (2013.01); H05F 3/02 (2013.01)

(58) Field of Classification Search
CPC ........ B65D 88/66; B65D 88/68; B65D 88/70; B65D 90/00; B65G 65/4872; H05F 3/02
See application file for complete search history.

(56) References Cited

U.S. PATENT DOCUMENTS

| | | | | |
|---|---|---|---|---|
| 4,034,898 A | * | 7/1977 | Marttila ................. | A01K 39/01 |
| | | | | 222/242 |
| 8,439,236 B2 | * | 5/2013 | Okabe .................... | B65D 88/68 |
| | | | | 222/236 |
| 9,919,865 B2 | * | 3/2018 | Steele ...................... | B65G 3/04 |

FOREIGN PATENT DOCUMENTS

EP 2407397 A1 * 1/2012 ............. B65D 88/68

* cited by examiner

*Primary Examiner* — Frederick C Nicolas
(74) *Attorney, Agent, or Firm* — Workman Nydegger

(57) ABSTRACT

A powder bridging breaker includes a housing, a power transmission assembly, an upper cover, a lower cover, a blade, and a gear motor. The powder bridging breaker is fixed under the hopper, with a powder passage formed in the middle. A gear box includes a connecting pipe on each side thereof to be connected to the housing. One crossbeam houses the power transmission assembly. The other crossbeam is a high-pressure air channel. The upper cover includes an arm with a blade connected at one end of the arm. The gear motor is connected to the housing and drives the transverse drive shaft to rotate. Through a combination of a transverse and a longitudinal bevel gear, the longitudinal drive shaft is rotated, driving the upper cover and the blade moving in a circular path to break the adhesion and cohesion forces between the powder particles.

9 Claims, 10 Drawing Sheets

POWDER BRIDGING BREAKER

FIELD OF THE INVENTION

The present invention relates to a powder bridging breaker, and more particularly, to a device that utilizes the power from a gear motor through a set of power transmission mechanism to change the direction of power and drive a blade, thereby using the blade to eliminate powder bridging, so as to promote smooth powder discharging from the hopper and facilitating smooth production.

BACKGROUND OF THE INVENTION

Powders of various types present different challenges to powder factories due to their unique physical properties such as reactivity or adhesion. Natural phenomena like adhesion, agglomeration, brittleness, blockage, bridging, and segregation in powders can all lead to production halts in powder factories. To effectively address these issues poses significant challenges to system designers, manufacturers, and users alike, particularly in modern production facilities that lean towards largescale, automated, and labor-saving processes. For producers, the smooth transportation of powders is often more pressing than quality concerns.

Powder bridging phenomenon refers to the interaction of the adhesion and friction among the powder, that causes the powder become compact and firm, this produce a supporting force that balances the weight from above, it will maintain static equilibrium and block the output of the powder, even if the supporting force below is zero.

Among the aforementioned challenges, powder bridging causing production halts is the most common nuisance during powder factory operations. Effectively addressing this nuisance is crucial for the production efficiency of powder factories.

Common strategies for addressing powder bridging and their drawbacks.

Increasing the angle of the hopper funnel: This method cannot completely solve the problem of powder bridging and also reduces the storage space of the hopper.

Impact: This method causes significant damage to the hopper structure and may result in flushing of the powder above. The practical effectiveness of this method is low.

High-pressure air jetting: Firstly, the consideration of high-pressure air causes dust to fly and increases the working environment temperature, rapidly elevating the risk of dust explosions. Secondly, compressed air is high in temperature and moisture content, which can promote powder agglomeration and alter powder quality. Furthermore, when a large amount of air is expelled, filtration devices need to be installed, adding operational complications.

Vibrators: The impact and shaking from vibrator operation may generate high temperatures or even sparks, posing concerns about powder explosions. Most of the vibrational energy is absorbed by the hopper, causing significant damage to its structure. Vibrations may impose an opposite effect on certain materials, making them denser with increased vibration or causing particle segregation, which is detrimental to powder quality stability.

As disclosed in European Patent Application EP2407397A1, the solution involves placing an inner ring between the upper body and the lower body. A ring of steel balls that functions as bearing to support the inner ring between the upper body, lower body, and the inner ring. A gear motor drives the inner ring to rotate between the upper body and the lower body via gears. A blade holder is fixed to the inner ring, with a blade located inside. As the inner ring moves around the circumference of hopper, it eliminates the bridging of powder particles inside the hopper, allowing the powder to fall.

In application, this solution has the following shortcomings.

Namely, although a sealing ring is installed between the upper body and the inner ring, between the lower body and the inner ring, and supplemented with air purging, the purpose is to prevent powder from entering the gear area inside the inner ring. However, there is a gap between the inner ring and the upper and lower bodies, coupled with the large circumference of the inner ring, the air purging cannot achieve uniform pressure. These negative factors lead to powder infiltrating the mechanical structure of the inner ring from the gap during operation, causing wear on the inner ring and gear, resulting in device damage.

The present invention provides a device for eliminating powder bridging and effectively preventing powder intrusion into the internal mechanical structure. The present invention provides a device to prevent powder intrusion and consequent wear on the power transmission components affecting their transmission. The device is equipped with three protective mechanisms, ensuring the stability and effectiveness of the present invention during operation.

SUMMARY OF THE INVENTION

The present invention relates to a powder bridging breaker configured to be installed at an outlet end of a hopper. The powder bridging breaker comprises a housing which is a ring shape body and has a powder passage formed in a center thereof. A gear box is positioned at a center of the housing, with a first crossbeam and a second crossbeam located on an inner edge of the housing and located opposite to each other. The first and second crossbeam support the gear box located at the center of the body. The first crossbeam is a hollow tubular structure so as to accommodate a mechanical drive structure, and the second crossbeam a hollow tubular structure so as to serve as a compressed air conduit.

A power transmission assembly comprises a longitudinal drive shaft, a longitudinal bevel gear, a transverse bevel gear, and a transverse drive shaft. The longitudinal drive shaft is inserted through the gear box and connected to an upper cover. The longitudinal drive shaft is connected to the longitudinal bevel gear. The transverse drive shaft is inserted into the first crossbeam and connected to the transverse bevel gear. The transverse bevel gear is engaged with the longitudinal bevel gear.

An upper cover is positioned at a top of the gear box. An arm extends from one side of the upper cover, and a blade holder is located at an end of the arm. A blade is movably connected to the blade holder for removal, cleaning, or replacement. A gear motor is connected to the transverse drive shaft to rotate the transverse drive shaft. When the transverse drive shaft rotates, the longitudinal drive shaft is driven through the transverse bevel gear and the longitudinal bevel gear to rotate the upper cover to drive the blade for rotational movement. A gear motor holder is connected between the body and the gear motor. The transverse drive shaft is positioned within the gear motor holder.

The present invention utilizes the configuration of longitudinal and transverse bevel gears in the power transmission assembly to enable the driving direction of the gear motor to be redirected while still providing power transmission to the blade for breaking powder bridging. The overall installation and transmission structure of this invention is simple, causing no vibration nor noise during operation. It does not affect the working temperature, and through the slow movement of the blade, it not only eliminates the bridging but also prevents powder from flying, ensuring stability and safety during powder discharge.

The working environment of this device of the present invention is filled with powder and dust. Therefore, it is necessary to effectively prevent powder intrusion to ensure that the device is not to be worn or damaged. For this aspect, the device of the present invention is designed with three layers of protective mechanisms to maintain safe and effective operation.

The first layer of protection is air purging. High-pressure air is introduced from the center of the gear box during operation and blown out through the gap between the upper cover and the gear box, creating a high-pressure area inside the gear box. Thus prevents powder intrusion, enhancing protection against powder invasion as to ensure smooth operation without wear due to powder intrusion, thereby prolonging the service life of the invention.

The second layer of protection is labyrinth sealing. When the conveying system is not in operation, the device may be surrounded by powder, and at this time, the supply of high-pressure air may stop. The concave and convex structure of the labyrinth seal presents a barrier that prevents powder from infiltrating the gap between the upper cover and the gear box. The labyrinth seal of the device, located at the top ring surface of the gear box, consists of at least one lower labyrinth seal, and an upper labyrinth seal on the bottom of the upper cover and located corresponding to the lower labyrinth seal. This structure makes it difficult for powder to effectively pass through the gap between the upper and lower labyrinth seals, further enhancing the blocking effect on powder and improving protection.

The third layer of protection is mechanical shaft sealing. Mechanical shaft seals are installed before the bearings of the transverse and longitudinal drive shafts, acting as the last line of defense against powder intrusion into the gear box. This effectively prevents powder from invading the power transmission components, ensuring the effective and stable operation of the invention.

Additionally, at least one bearing is installed between the longitudinal drive shaft and the gear box or between the longitudinal drive shaft and the lower cover, and at least one bearing seal is provided for each bearing. Bearings are located at the front and rear ends of the transverse and longitudinal drive shafts, each bearing being equipped with a bearing seal.

Furthermore, the top of the upper cover is conically shaped, and an arm extends from one side of the upper cover, with a blade holder installed at the end of the arm. The shape of the blade holder fixes the direction of the blade to prevent swaying, and the blade is connected to the arm as a movable unit, allowing the blade to be easily removed for cleaning or replacement.

Moreover, at least one earthing point is provided on the outer surface of the housing, with the earthing point connected to a ground wire to dissipate static electricity generated by powder friction.

Lastly, this device offers two options for mounting and fixing: one is flange connection, and the other is pipe clamp connection. This is to accommodate individual operational needs and provide flexibility for powder plants. Flange installation is generally used for stable installation, while pipe clamping is chosen for frequent disassembly and special processes (such as cleaning or disinfection), demonstrating the high adaptability of the structural configuration of this invention and improving convenience and efficiency during disassembly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 7:
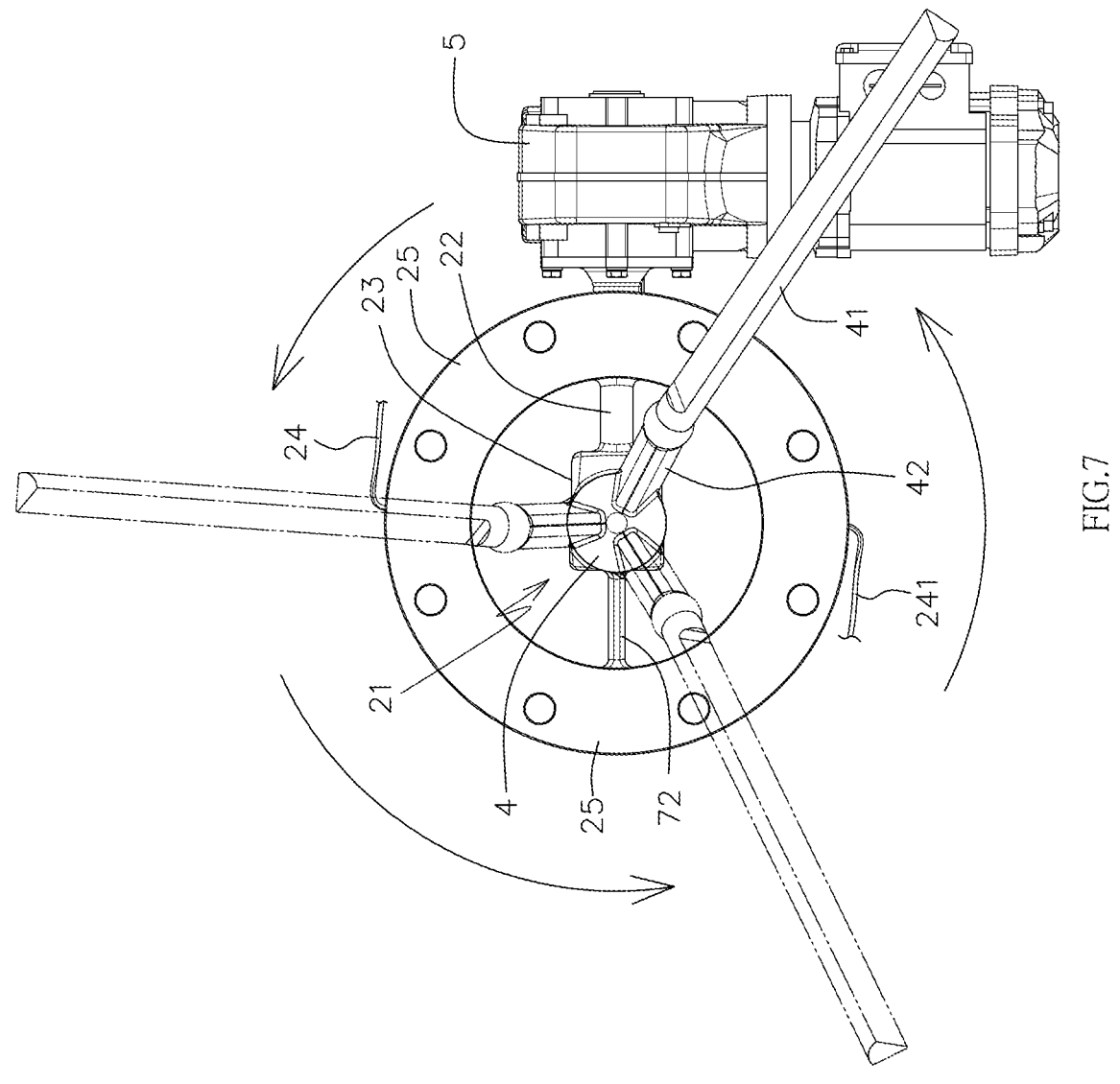
FIG. 7 is a top view of the present invention.
Figure 8:
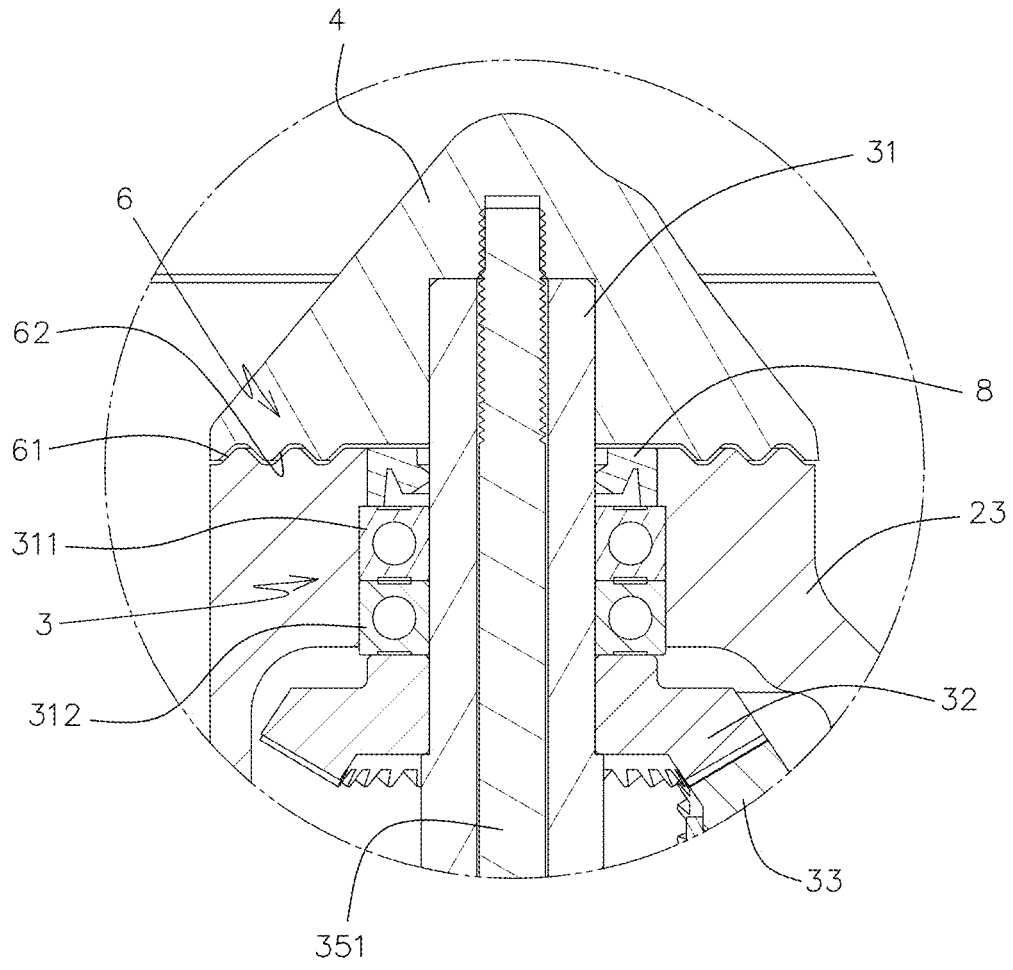
FIG. 8 is a partial enlarged view showing the assembly of the labyrinth seal, power transmission assembly, and upper cover of the present invention.
Figure 9:
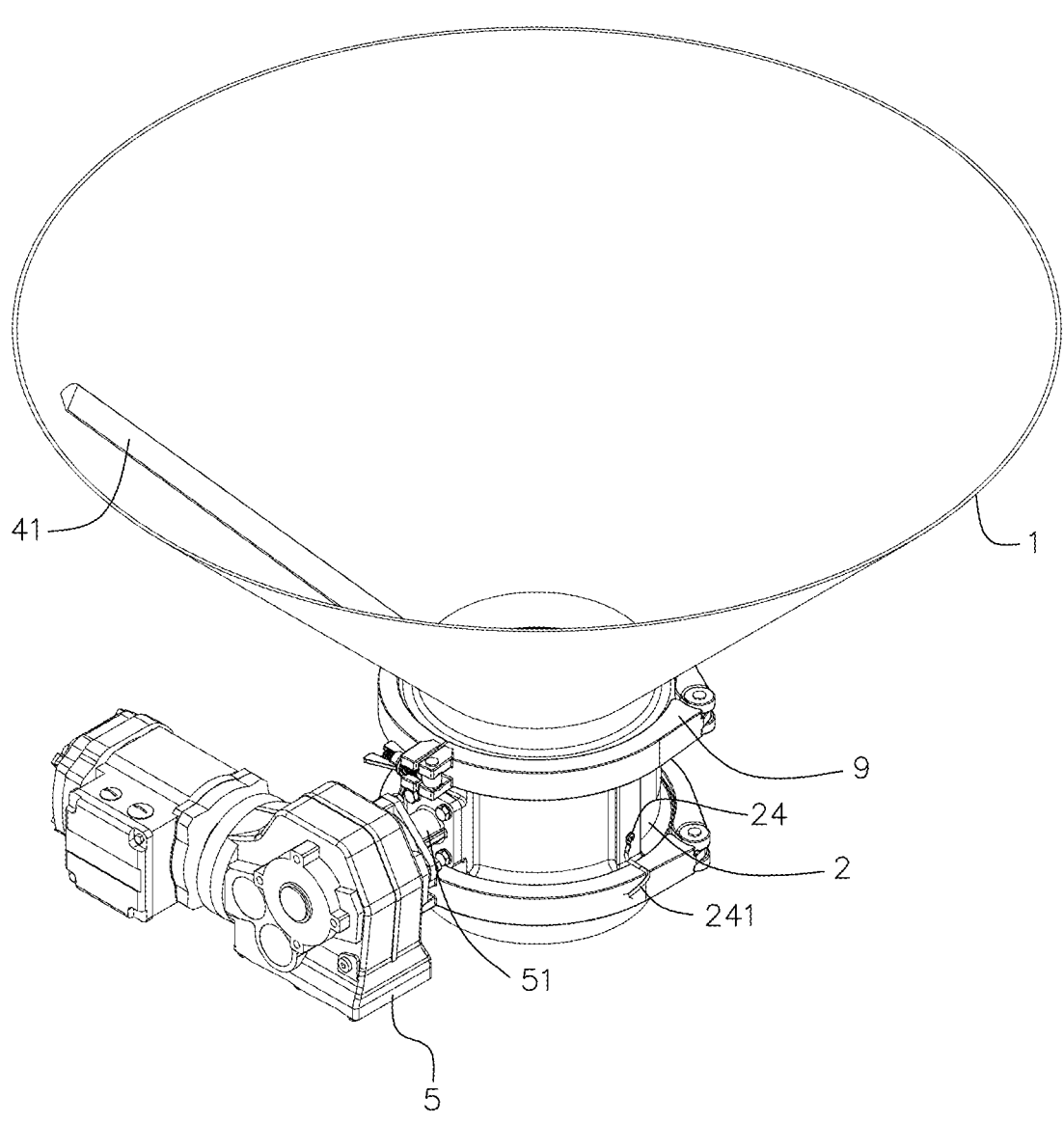
FIG. 9 is a perspective view of another embodiment of the present invention, showing the connection with the hopper using a quick-detach structure.
Figure 10:
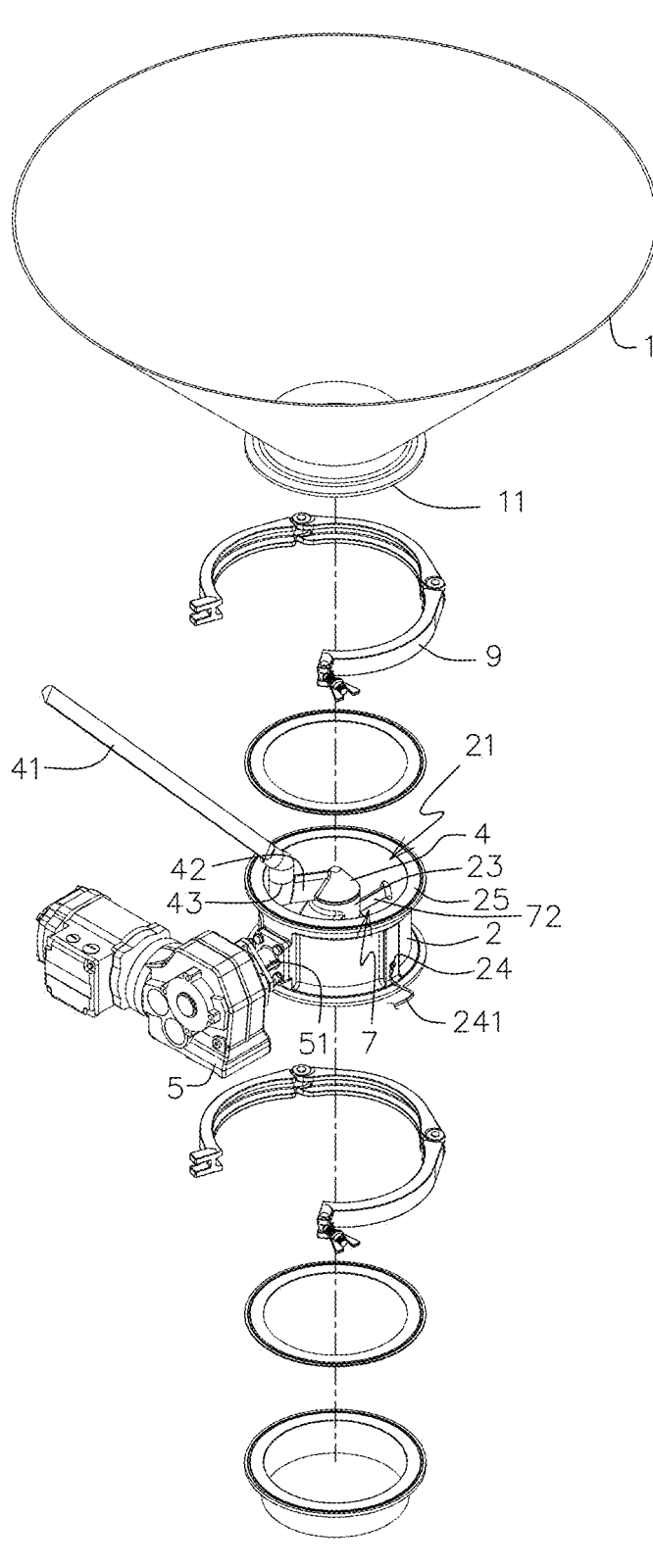
FIG. 10 is a cross sectional view based on FIG. 9.

Referring to FIGS. 1 to 8, the present invention is a powder-bridging-breaking device, which is to be installed at an outlet end 11 of a hopper 1. The powder-bridging-breaking device comprises a housing 2, which is ring-shaped and reinforced with ribs to enhance structural strength while reducing the weight. The shape of the housing 2 can be configured to match the outlet end 11 of the hopper 1 for connection. The hopper 1 is used to contain powder "P", which can be discharged through the outlet end 11 via the housing 2. The housing 2 forms a powder passage 21 in the middle, allowing the powder "P" discharging through the passage 21. The housing 2 is equipped with a first crossbeam 22 and a second crossbeam 72 on one side of its inner edge. The first crossbeam 22 and a second crossbeam 72 are located on an inner edge of the housing 2 and located opposite to each other. The first and second crossbeam 22, 72 support the gear box 23 located at the center of the housing 2. The first crossbeam 22 is a hollow tubular structure so as to accommodate a mechanical drive structure, and the second crossbeam 72 a hollow tubular structure so as to serve as a compressed air conduit. The first crossbeam 22 is connected to a gear box 23 at one end of the powder passage 21, while the other end is connected to the outer surface of the housing 2. The first crossbeam 22 includes a hole 221 formed to its outer surface. In a specific embodiment, stainless steel precision castings are used for higher precision, strength, corrosion resistance, and easy maintenance. The bottom of the housing 2 is connected to other powder conveying equipment, such as rotary valve, for powder feeding. Different installation methods are available for the hopper 1, such as flange connection or clamp connection, depending on specific operational needs. As for the installation method of hopper 1, as shown in FIGS. 1 to 8, the housing 2 can be equipped with flanges 25 on the side edges of its top and bottom, allowing direct connection and locking with the hopper 1. The bottom of the housing 2 can be connected to other powder conveying devices in the same way. In other embodiments, for example, when special processes such as planned schedule cleaning or disinfection are frequently required for the hopper 1 or the housing 2, as shown in FIGS. 9 and 10, a tri-clamp or pipe clamp 9 can be used for quick disassembly, thereby improving the convenience and applicability of the present invention. It can be adapted to various types of hopper 1 and facilitate corresponding disassembly and cleaning maintenance. Depending on the production nature of the powder factory, the production system can be determined to use flanges 25 or pipe clamps 9 as the connection method. Therefore, depending on the pipe joint form of the powder factory, the housing 2 selectively uses flanges 25 or pipe clamps 9 at the top to correspond to the assembly at the outlet end 11 of the hopper 1.

A power transmission assembly 3 includes a longitudinal drive shaft 31, a longitudinal bevel gear 32, a transverse bevel gear 33, and a transverse drive shaft 34. The longitudinal direction corresponds to the direction of the powder passage 21 of the housing 2. The longitudinal drive shaft 31 is inserted into the gear box 23 and pivotally connected to the gear box 23. The upper cover 4 is connected to the top of the longitudinal drive shaft 31 which drives the upper cover 4. The longitudinal drive shaft 31 is drivingly connected to the longitudinal bevel gear 32, while the transverse drive shaft 34 is inserted into the first crossbeam 22 and drivingly connected to the transverse bevel gear 33. The transverse bevel gear 33 is engaged with the longitudinal bevel gear 32. The gear box 23 accommodates the longitudinal bevel gear 32 and the transverse bevel gear 33. For the purpose of speed reduction, in one embodiment, the longitudinal bevel gear 32 is configured with a larger and more teeth, while the transverse bevel gear 33 is configured with smaller and fewer teeth, achieving the purpose of directional transmission and speed reduction.

The upper cover 4 is located at the top of the gear box 23 and is connected to the longitudinal drive shaft 31, so that the longitudinal drive shaft 31 is able to rotate the upper cover 4. The upper cover 4 has a blade 41 which is located at the top of housing 2. As for the placement of the blade 41, it can be achieved by extending an arm 42 from one side of the upper cover 4, where the end of the arm 42 is equipped with a blade holder 43. The design of the blade holder 43 ensures that the blade 41 is securely positioned to prevent it from swaying. The blade 41 can be directly attached to the blade holder 43 or connected through a movable joint, allowing the blade 41 to be removed from the blade holder 43 for cleaning or replacement. The blade 41 can be inclined to correspond to the profile of the hopper 1, ensuring that it accurately matches the contour of the hopper 1, accommodating different hopper angles of various powder plants. Through the connection arrangement between the blade 41 and the arm 42, it is possible to select the appropriate length or inclination of the blade 41 based on the shape or diameter of the hopper 1, and to secure it directly or through screws to the arm 42.

A gear motor 5, in one embodiment, can be configured as a speed reduction motor to provide power. Through this configuration, the gear motor 5 can output power to rotate the transverse drive shaft 34 positioned within the first cross beam 22. As described earlier, the power transmitted through the longitudinal bevel gear 32 is redirected and reduced its speed to drive the longitudinal drive shaft 31, thereby driving the upper cover 4. Consequently, the upper cover 4 drives the blade 41 to rotate along a circular path at a slow speed, causing the disruption of bridging phenomenon of the powder "P". Preferably, as shown in FIG. 6, the blade 41 can extend to a certain depth within the hopper 1, allowing for rotational movement along the wall of the hopper 1 when subjected to receiving force, facilitating the disruption of powder "P" bridging.

Figure 5:
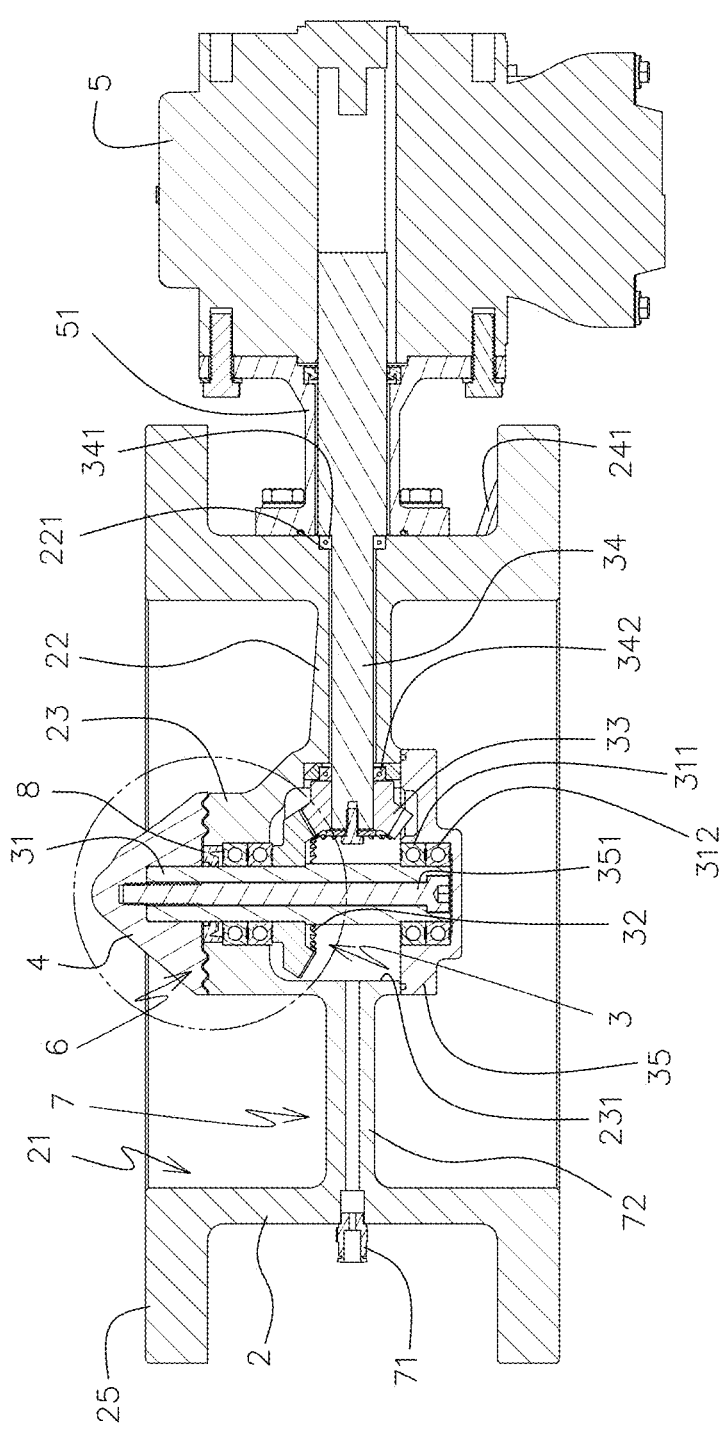
FIG. 5 is a cross sectional view, taken along line A-A of FIG. 1.
Figure 6:
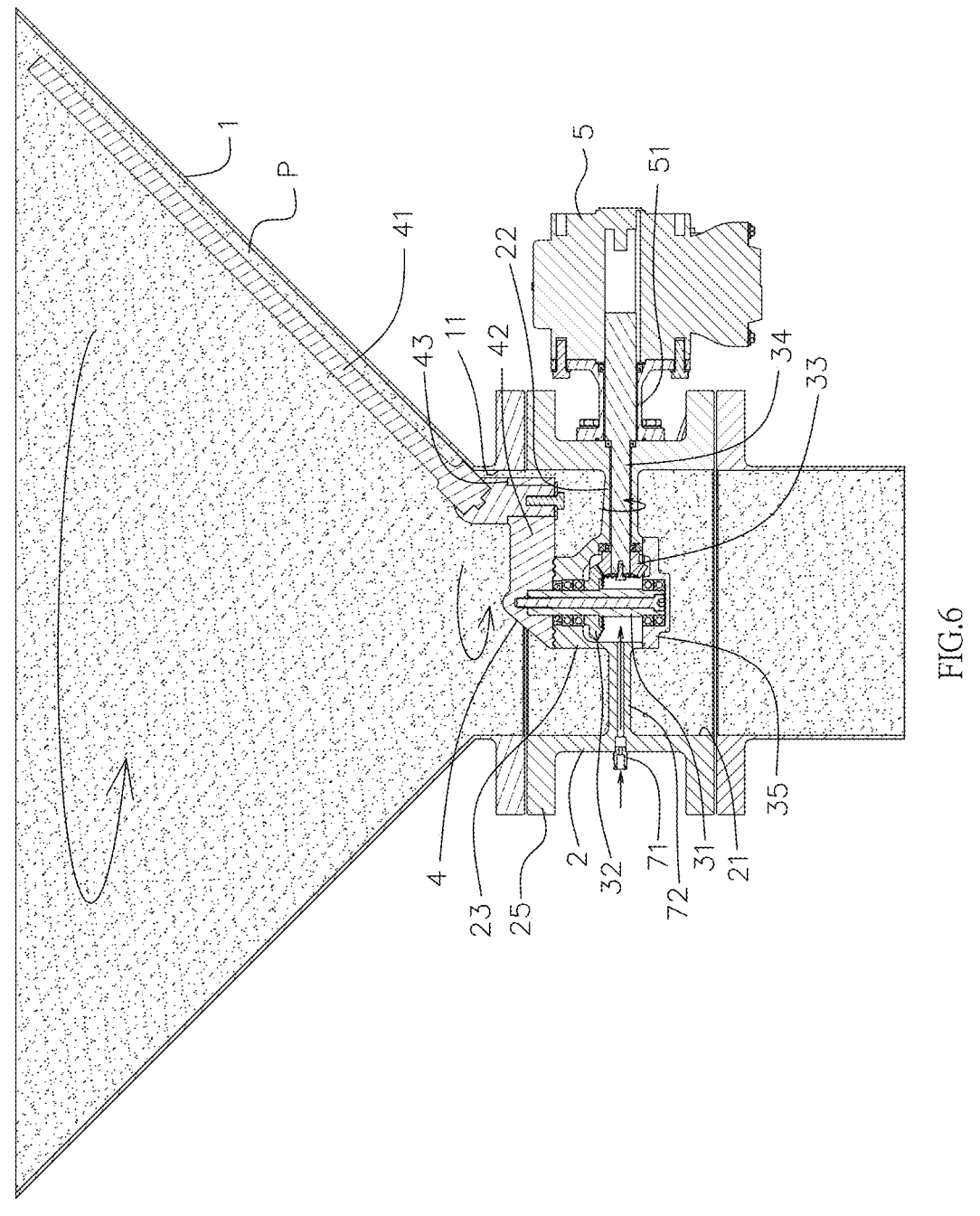
FIG. 6 is a cross sectional and operational view of the present invention when installed in a hopper.

As shown in FIGS. 5 to 7, since the longitudinal drive shaft 31, longitudinal bevel gear 32, and transverse bevel gear 33 of the power transmission assembly 3 are mainly arranged inside the gear box 23 to drive the upper cover 4 and blade 41 through mechanical motion, the power transmission is relatively simple and does not involve complex transmission methods. Therefore, during operation, it does not generate vibration nor noise. Through the aforementioned speed reduction drive configuration, it travels along a circular path inside the hopper 1, allowing its kinetic energy to continuously disrupt the bridging (or static equilibrium) of the powder "P" in the hopper 1 or the powder passage 21 of the housing 2. Additionally, if the rotation speed of the blade 41 is too fast, it may stir the powder "P" to become airborne, posing a potential risk of dust explosion. Therefore, the blade 41 rotates slowly to keep the powder "P" stable and prevent it from becoming airborne. Since the output speed of the gear motor 5 cannot meet the requirement for low speed, the longitudinal bevel gear 32 and transverse bevel gear 33 are used for further speed reduction to enable slow movement, preventing the powder "P" from becoming airborne and allowing it to smoothly pass through the housing 2 for powder discharge.

In one embodiment of the present invention, to prevent the risk of dust explosion due to static electricity generated by the contact friction of powder "P" particles, which is an important aspect that relevant operating facilities must guard against, the present invention is equipped with at least one earthing point 24 on the housing 2. The earthing point 24 is connected to a ground wire 241, allowing the static electricity accumulated due to the friction of powder "P" to be dissipated through the ground wire 241. Thus prevents the occurrence of static discharge.

Regarding the assembly configuration of the power transmission component 3, as disclosed in FIGS. 5 and 6, where the upper cover 4 is positioned at the top of the gear box 23, to prevent powder "P" from accumulating on the upper cover 4. Preferably, the top end of the upper cover 4 is conically shaped. This allows the upper cover 4 to meet the hygiene requirements of food processing processes, as powder "P" cannot accumulate on conical surfaces but may accumulate on flat surfaces. Therefore, the conical configuration serves to guide the powder "P" and prevent powder retention. It should be noted that the cross-sectional views shown in FIGS. 5 and 6 are taken from the position of the first crossbeam 22, presenting the transmission configuration of the present invention. Thus, the first crossbeam 22 appears to block the view of the powder passage 21 in the housing 2. However, in reality, the first crossbeam 22 and the gear box 23 are not completely obstructing the powder passage 21, as shown in FIG. 7, allowing powder "P" to be discharged from the powder passage 21. Regarding the placement of the transverse drive shaft 34, for the purpose of supporting and positioning it within the first crossbeam 22 and enabling transmission connection with the gear motor 5 at one end, a gear motor holder 51 is installed. The gear motor holder 51 is correspondingly positioned between the housing 2 and the gear motor 5, allowing for the alignment between the housing 2 and the gear motor 5. The transverse drive shaft 34 is positioned within the gear motor holder 51 and is supported and pivoted through a transverse drive shaft bearing 341, 342. Additionally, the transverse drive shaft 34 can be directly assembled or locked to transmit power to the transverse bevel gear 33, enabling it to rotate synchronously with the transverse bevel gear 33.

Regarding the transmission configuration of the longitudinal drive shaft 31, which is connected between the upper cover 4 and the longitudinal bevel gear 32. In one embodiment, is can be achieved by setting grooves and keys to correspondingly assemble and transmit, thereby enhancing the stability of power transmission. To facilitate the rotation and positioning arrangement of the longitudinal drive shaft 31 within the gear box 23, in one embodiment, the bottom end of the gear box 23 may have an opening 231 to facilitate the assembly of the longitudinal drive shaft 31 and the longitudinal bevel gear 32 from the opening 231. Through the installation of a bottom cover 35, it can correspondingly seal and cover the opening 231 at the bottom of the gear box 23, and the bottom cover 35 corresponds to the longitudinal drive shaft 31. In one embodiment, the bottom cover 35 is equipped with a locking screw 351, corresponding to the longitudinal drive shaft 31 and can be assembled with the upper cover 4 synchronously rotating with the longitudinal drive shaft 31 and the upper cover 4, facilitating a secure axial positioning of the longitudinal drive shaft 31. Preferably, to ensure smooth rotation of the longitudinal drive shaft 31 without being affected by the pressure of powder "P", at least one drive shaft bearing 311, 312 is be provided between the longitudinal drive shaft 31 and the gear box 23, or between the longitudinal drive shaft 31 and the bottom cover 35. Ideally, two pairs of drive shaft bearings 311, 312 can be placed at the top and bottom ends of the longitudinal drive shaft 31 to support the drive shaft bearings 311, 312 while ensuring smoothness and effectiveness during rotation.

Furthermore, as shown in FIG. 6, since the present invention is used to be installed at the outlet end 11 of the hopper 1, the powder "P" can enter the powder passage 21 of the housing 2 through the outlet end 11. As described above, the present invention can be driven by the gear motor 5 to sequentially transmit through the transverse drive shaft 34, the transverse bevel gear 33, the longitudinal bevel gear 32, and the longitudinal drive shaft 31 to drive the upper cover 4, thereby driving the blade 41 to rotate. During this process, the powder passage 21 inside the housing 2 will be filled with powder "P". Since some particles of the powder "P", depending on their type, have smaller diameters, measures are taken in the present invention to prevent the powder "P" from invading and causing jamming or wear in the mechanism.

In particular, since the upper cover 4 can pivot on the gear box 23, there is no tight seal between them. In the structural arrangement of the present invention, there may be a slight gap only between the top of the gear box 23 and the upper cover 4, while there are no concerns about invasion at other locations. Therefore, to prevent the powder "P" from entering through the aforementioned gap, in a feasible embodiment, the entire upper cover 4 may shield the top of the gear box 23, or a sealed bearing arrangement may be placed between them.

The present invention comprises three layers of powder intrusion protection mechanisms:

The first layer of protection mechanism is an air purging device 7, which includes a high-pressure air pipe joint 71 installed on one side of the inner edge of the housing 2. In one embodiment, the high-pressure air pipe joint 71 corresponds parallel to the first connecting pipe 22, and one end of the high-pressure air pipe joint 71 is connected to the gear box 23, while the other end is located on the outer circumferential surface of the housing 2. This arrangement allows the high-pressure air pipe joint 71 to be connected to an external compressed air source (not shown in the figure) as disclosed in FIGS. 5 and 6, enabling it to output high-pressure gas to the high-pressure air pipe joint 71 and enter the gearbox 23, forming a positive pressure zone inside the gearbox 23. By using high-pressure air pressure, it shields the intrusion of powder P into the gearbox 23, achieving the first layer of protection. This helps maintain the transmission state of various components of the present invention, preventing wear caused by the intrusion of powder "P" and ensuring smooth operation, thereby significantly improving its service life.

Figure 1:
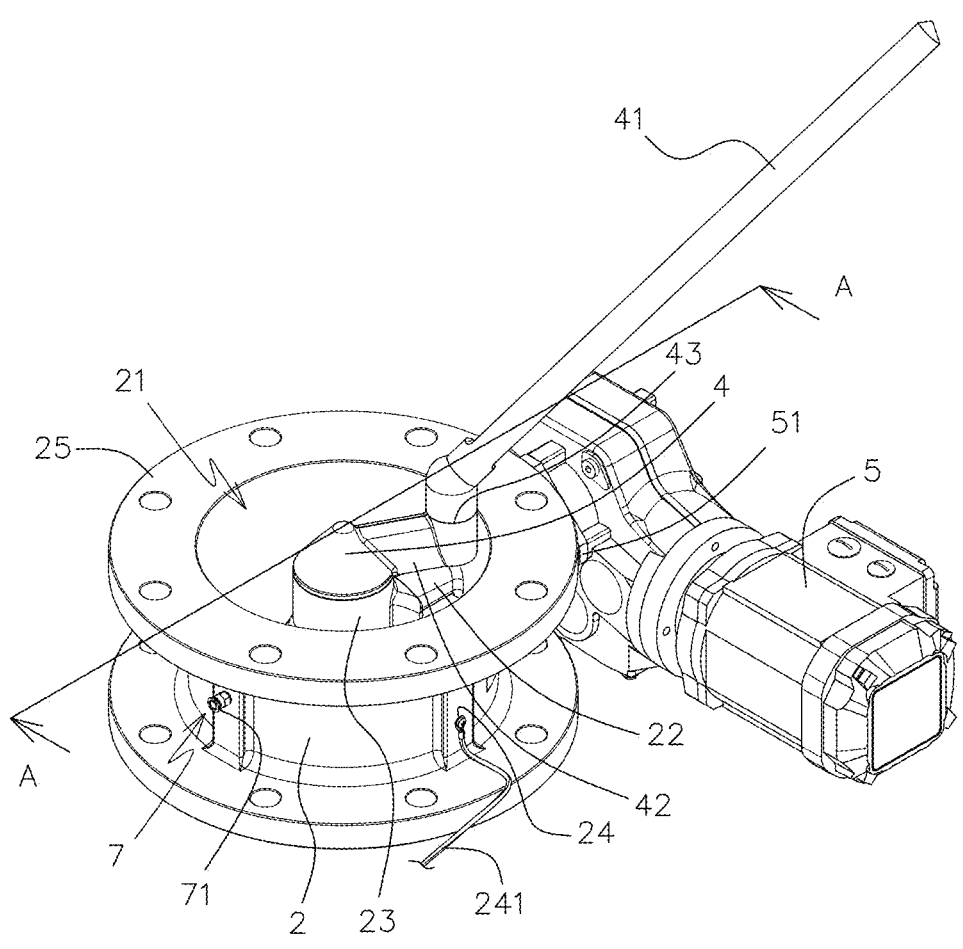
FIG. 1 is a perspective view of the present invention.
Figure 2:
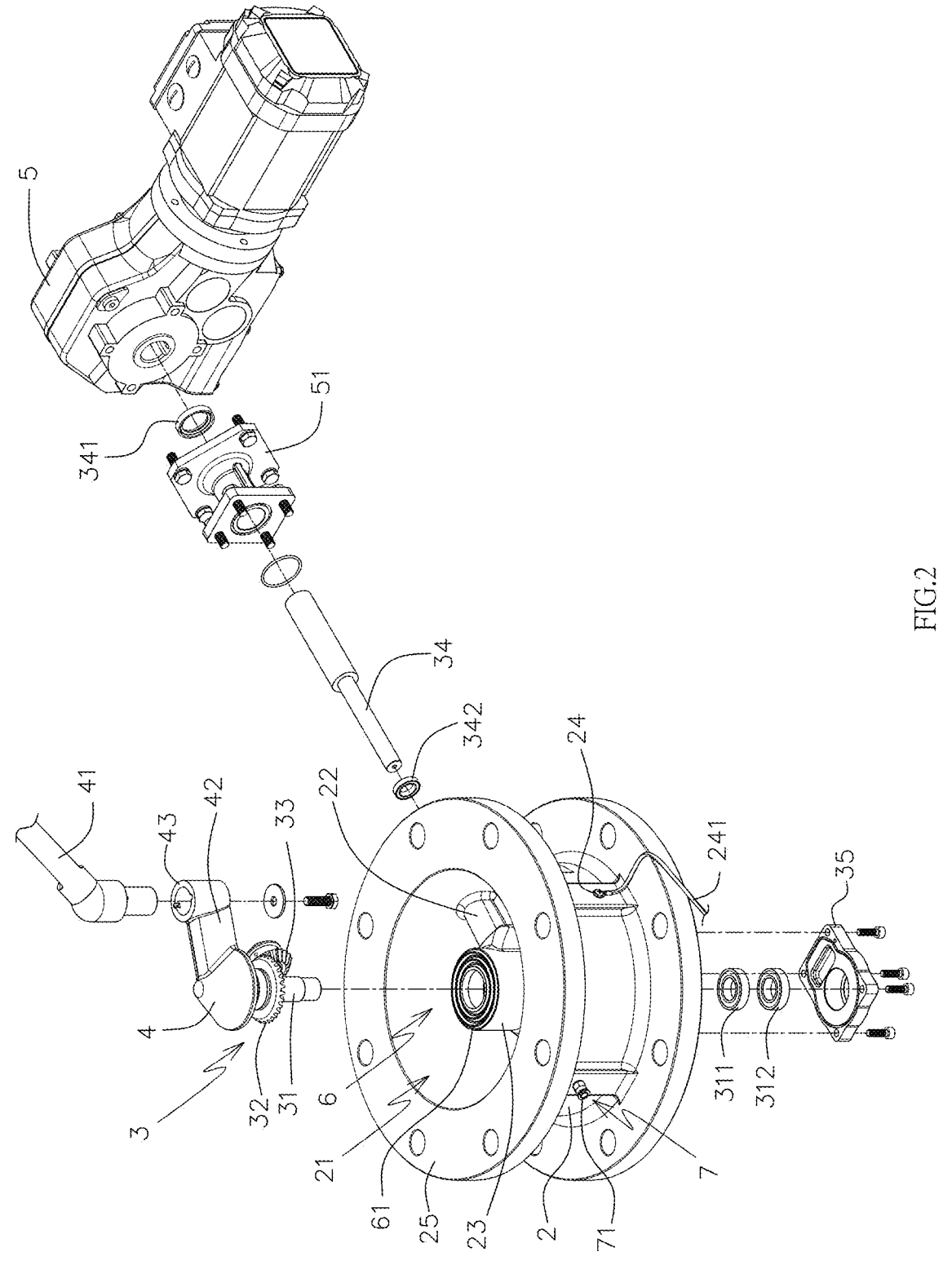
FIG. 2 is an exploded view of the present invention.
Figure 3:
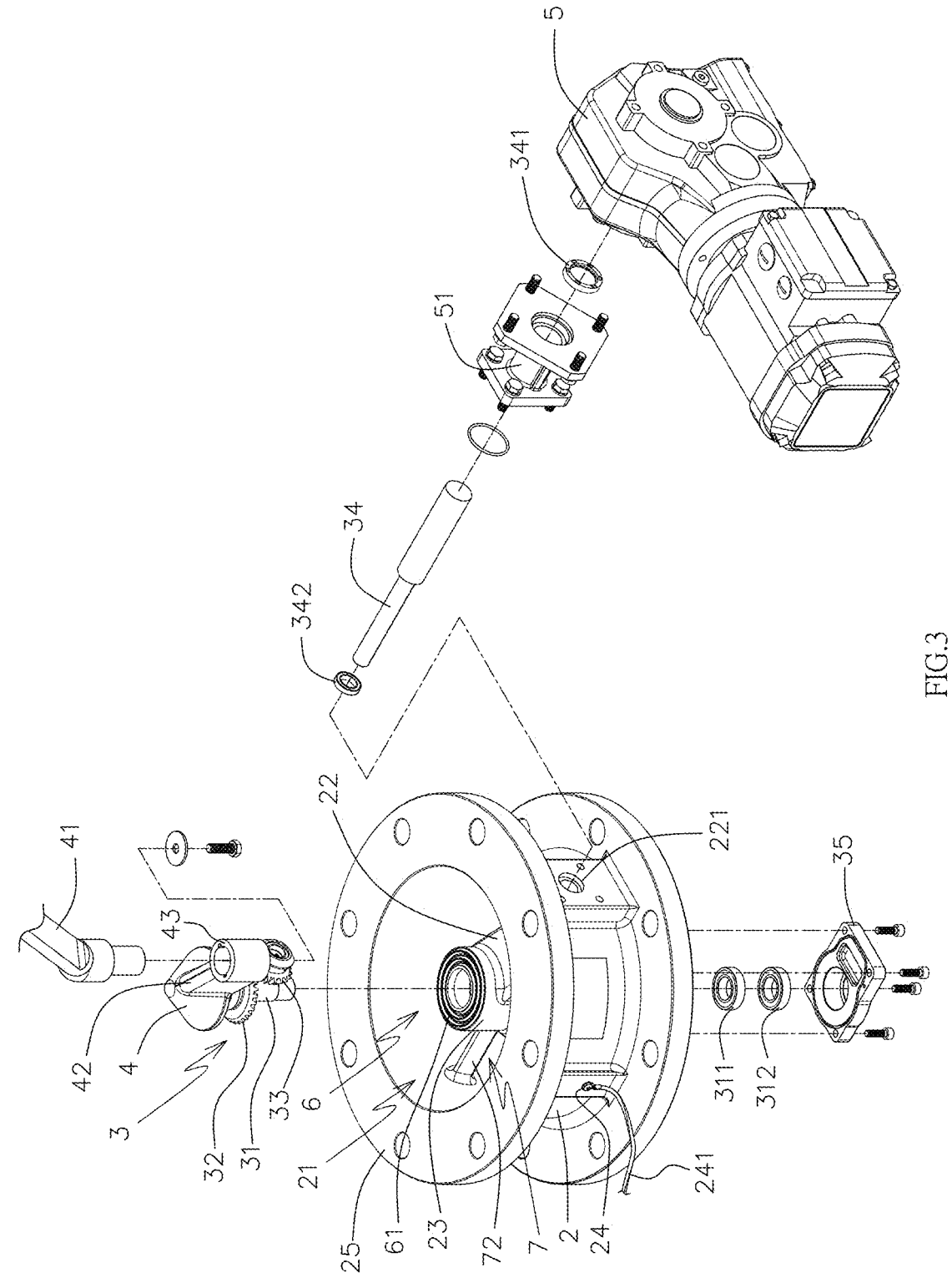
FIG. 3 is another exploded view, from another angle of the present invention.
Figure 4:
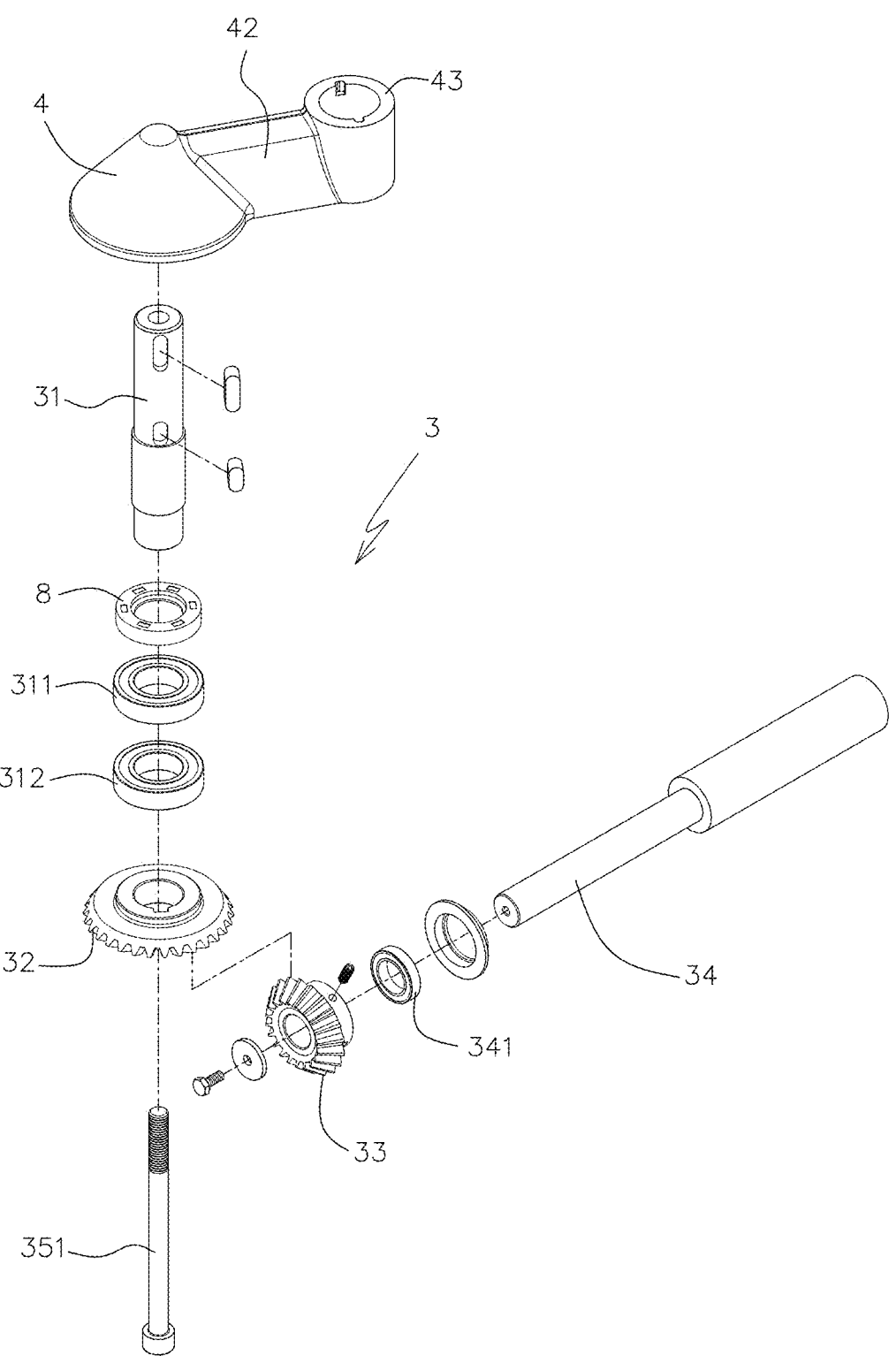
FIG. 4 is an exploded view of the present invention of the power transmission assembly and upper cover.

The second layer of protection mechanism is the labyrinth seal 6, which includes at least one lower labyrinth seal 61 set at the top circumferential surface of the gear box 23, and the bottom of the upper cover 4 has the upper labyrinth seal 62 located corresponding to the lower labyrinth seal 61. These may be directly formed by the gear box 23 or the upper cover 4, respectively. The upper cover 4 is located and covers the top of the gear box 23 to block the powder "P" through the upper labyrinth seal 62 and the lower labyrinth seal 61, making it difficult for it to invade or get stuck between the gear box 23 and the upper cover 4. Ideally, the labyrinth seal 6 comprises complementary labyrinth seal features between the upper labyrinth seal 62 and the lower labyrinth seal 61, configured with concave and convex features resembling a labyrinth seal. As shown in FIGS. 2, 6, and 8, in one embodiment, the upper labyrinth seal 62 can be annularly distributed on the top circumferential surface of the gear box 23 and can have serrated grooves for concave and convex toothed groove placement. The lower labyrinth seal 61 at the bottom of the upper cover 4 can correspondingly have teeth to match and closely approximate the concave and convex profile of the upper labyrinth seal 62. This configuration creates labyrinth-like gaps between the upper labyrinth seal 62 and the lower labyrinth seal 61, as depicted in FIG. 8. Even if powder "P" intrudes, it will be hindered or retained by each concave and convex labyrinth seal feature of the upper labyrinth seal 62 or the lower labyrinth seal 61, significantly increasing the difficulty of intrusion. This effectively blocks the intrusion of powder "P", ensuring that the invention can be efficiently transmitted without being affected by powder "P" intrusion, which could cause wear or jamming, thereby enhancing operational effectiveness and stability.

The third layer of protection mechanism is the mechanical shaft seal, such as the bearing seal 8, which is installed at one end of the longitudinal drive shaft 31 in the gear box 23. It corresponds to the sealing joint between the longitudinal drive shaft 31 and the gear box 23, forming an end protective means. This provides direct and effective blocking of powder "P" through physical mechanical means, preventing its intrusion into the power transmission assembly 3, ensuring the effective and stable operation of the present invention.

While we have shown and described the embodiment in accordance with the present invention, it should be clear to those skilled in the art that further embodiments may be made without departing from the scope of the present invention.

What is claimed is:

1. A powder bridging breaker configured to be installed at an outlet end (11) of a hopper (1), and comprising:

a housing (2) being a ring shape body and having a powder passage (21) formed in a middle thereof, a gear box (23) positioned at a center of the housing (2), a first crossbeam (22) and a second crossbeam (72) located on an inner edge of the housing (2) and located opposite to each other, the first and second crossbeam (22), (72) supporting the gear box (23) located at the center of the housing (2), the first crossbeam (22) being a hollow tubular structure so as to accommodate a mechanical drive structure, the second crossbeam (72) being a hollow tubular structure so as to serve as a compressed air conduit;

a power transmission assembly (3) comprising a longitudinal drive shaft (31), a longitudinal bevel gear (32), a transverse bevel gear (33), and a transverse drive shaft (34), the longitudinal drive shaft (31) inserted through the gear box (23) and connected to an upper cover (4), the longitudinal drive shaft (31) connected to the longitudinal bevel gear (32), the transverse drive shaft (34) inserted into the first crossbeam (22) and connected to the transverse bevel gear (33), the transverse bevel gear (33) engaged with the longitudinal bevel gear (32);

an upper cover (4) positioned at a top of the gear box (23), an arm (42) extending from one side of the upper cover (4), a blade holder (43) located at an end of the arm (42);

a blade (41) movably connected to the blade holder (43) for removal, cleaning, or replacement;

a gear motor (5) connected to the transverse drive shaft (34) to rotate the transverse drive shaft (34), when the transverse drive shaft (34) rotates, the longitudinal drive shaft (31) is driven through the transverse bevel gear (33) and the longitudinal bevel gear (32) to rotate the upper cover (4) to drive the blade (41) for rotational movement, and a gear motor holder (51) connected between the housing (2) and the gear motor (5), the transverse drive shaft (34) being positioned within the gear motor holder (51).

2. The powder bridging breaker as claimed in claim 1, wherein a labyrinth seal (6) comprises at least one lower labyrinth seal (61) positioned at the top of the gear box (23), an upper labyrinth seal (62) is located to a bottom end of the upper cover (4) and located corresponding to the at least one lower labyrinth seal (61), the upper cover (4) is positioned to cover the top of the gear box (23), the labyrinth seal (6) is configured with concave-convex features corresponding to each other between the upper labyrinth seal (62) and the at least one lower labyrinth seal (61).

3. The powder bridging breaker as claimed in claim 1, wherein an air purging device (7) comprises a high-pressure air pipe joint (71) positioned on one side of the inner edge of the housing (2), one end of the air purging device (7) is connected to the gear box (23) for inputting positive pressure into the gear box (23) through the high-pressure air pipe joint (71).

4. The powder bridging breaker as claimed in claim 1, wherein a bottom cover (35) is positioned at a bottom of the gear box (23), and the bottom cover (35) accommodates the longitudinal drive shaft (31).

5. The powder bridging breaker as claimed in claim 4, wherein at least one drive shaft bearing (311/312/341/342) is located between the longitudinal drive shaft (31) and the gear box (23), or between the longitudinal drive shaft (31) and the bottom cover (35), and at least one location of the transverse drive shaft (34).

6. The powder bridging breaker as claimed in claim 5, wherein each of the at least one drive shaft bearings (311/312/341/342) includes a bearing seal (8).

7. The powder bridging breaker as claimed in claim 1, wherein a top of the upper cover (4) is conically shaped.

8. The powder bridging breaker as claimed in claim 1, wherein a top of the housing (2) has a flange (25) or a pipe clamp (9) for being connected to the outlet end (11) of the hopper (1).

9. The powder bridging breaker as claimed in claim 1, wherein at least one earthing point (24) is provided on an outer surface of the housing (2), the earthing point (24) is connected to a ground wire (241) for discharging static electricity accumulated due to friction of the powder (P).

\* \* \* \* \*